United States Patent [19]
Haines

[11] 3,984,152
[45] Oct. 5, 1976

[54] FRUSTO-CONICAL LAMINAR BEARINGS

[76] Inventor: Charles E. Haines, 5811 Odessa, Wichita, Kans. 67220

[22] Filed: Dec. 14, 1971

[21] Appl. No.: 207,761

Related U.S. Application Data

[63] Continuation-in-part of Ser. No. 89,305, Nov. 13, 1970, abandoned.

[52] U.S. Cl. .................... 308/237 R; 308/238; 308/241; 308/70
[51] Int. Cl.² ................................. F16C 9/00
[58] Field of Search ............ 308/237, 238, 36, 37, 308/DIG. 4, DIG. 9, 241; 117/49; 252/12, 12.2, 12.4

[56] References Cited
UNITED STATES PATENTS

| | | | |
|---|---|---|---|
| 525,775 | 9/1894 | Wainwright | 308/70 |
| 1,684,862 | 9/1928 | Gay | 308/70 |
| 1,712,310 | 5/1929 | Sayre | 308/70 |
| 2,631,871 | 3/1953 | Stone | 285/106 |
| 2,901,380 | 8/1959 | Crump | 308/241 |
| 3,001,838 | 9/1961 | Lamson et al. | 308/241 |
| 3,031,212 | 4/1962 | Oliver | 285/192 |
| 3,056,637 | 10/1962 | Shanley et al. | 308/238 |
| 3,294,568 | 12/1966 | Gossmann | 308/241 |
| 3,420,586 | 1/1969 | Gerner | 308/70 |

FOREIGN PATENTS OR APPLICATIONS

W9,840  9/1955  Germany

OTHER PUBLICATIONS

DiSapio, "Bonded Coatings Lubricate Metal Parts," *Prod. Eng.*, pp. 48–53, Sept. 5, 1960.

*Primary Examiner*—Charles J. Myhre
*Assistant Examiner*—R. H. Lazarus
*Attorney, Agent, or Firm*—Ronald W. Mayes

[57] ABSTRACT

Laminar bearings having frusto-conical bearing surfaces of bonded thin solid film lubricant coatings that will carry dynamic stress loads of over one hundred thousand pounds per square inch for up to one million cycles or more.

2 Claims, 10 Drawing Figures

FRUSTO-CONICAL LAMINAR BEARINGS

This is a continuation-in-part application of U.S. patent application Ser. No. 89305 filed Nov. 13, 1970, now abandoned, of Charles E. Haines entitled "Laminar Bearings".

BACKGROUND OF THE INVENTION

This invention relates to bearings. More particularly, this invention relates to bearing surfaces and bearing assemblages.

SUMMARY OF THE INVENTION

An object of this invention is the provision of novel frusto-conical laminar bearings.

Another object of this invention is the provision of novel frusto-conical laminar bearing means having bonded thin solid film lubricant coatings on multiple laminar surfaces thereof.

A still further object of this invention is the provision of novel bearing means as set forth in one or more of the preceding paragraphs wherein the bonded coatings of the thin solid film lubricant are each preferably 0.0002 to 0.0005 inches thick with a preferred maximum allowable thickness of 0.0010 inches.

Yet another object of this invention is the provision of novel bearing means having frusto-conical bearing surface elements each having thin solid film lubricant coating means bonded on the laminar bearing surfaces thereof.

Yet another object of this invention is the provision of novel bearing means as set forth in the preceding paragraph wherein the thin solid film lubricant is sprayed or painted on the bearings surfaces with the use of an inorganic binder material carrying one or more powdered lubricants selected from a group comprising or consisting of molybdenum disulfide, fluorinated graphite, and/or graphite, the coating is then cured or baked depending upon whether the binder is of a resinous material such as polyepoxide resin, or is of ceramic material such as aluminum phosphate, the epoxy resin being cured for preferably one hour at 400° F. and the ceramic binder being sintered preferably at temperatures of from 700° to 1000° F. for the desired period of time. The fluorinated graphite is comprised of powdered graphite that has turned white in appearance and measures out to be 1.1 mols fluoride to 6 mols carbon, preferably.

Another object of this invention is the provision of novel frusto-conical laminar bearing means that are easily and/or economically fabricated.

A still further object of this invention is the provision of novel bearing means as set forth in one or more of the preceding paragraphs wherein the bearing means are easily adjusted to control the spacing between and/or the axial loads on the bearing surfaces.

A feature of this invention is the provision of bearing means comprising frusto-conical laminar bearing surface elements each having solid film lubricant coating means bonded on the laminar bearing surfaces thereof sandwiched between frusto-conical inner and outer bearing race means. Preferably there is provision for the axial adjustment of the inner race means relative to the outer race means to regulate the spacing, clearance, and/or tolerance between the race means and/or the surface elements and/or to regulate the load on the surface elements and race means. It is preferred that threaded means such as screw threads, be used to effect the axial adjustment. In order to prevent the maladjustment of the threaded means, it is preferred that nylon thread engaging brake means be provided to prevent undesired axial maladjustment of the threaded means.

It has been found that the acute included angle of the frusto-conical laminae and bearing races is preferably 5° or more to prevent binding or clutching between the various bearing elements. For example, it is preferred that the taper of the frusto-conical laminae and bearing race means is at least 0.010 inch/inch of taper to eliminate the possibility of binding between the parts thereof.

Wear of materials occurs by adhesive or galling wear, abrasive and cutting wear, corrosive wear, surface fatigue, and other minor types of wear. High strength, corrosion resistant materials used in shielded or sealed bearings have been found to satisfactorily limit abrasive, corrosive, and surface fatigue wear. Significant control of adhesive wear is necessary for the making of successful sliding bearing surfaces.

Bonded solid film lubricants appear to be uniquely different from other engineering materials since they will satisfactorily lubricate surfaces under dynamic stress loads of 100,000 p.s.i. or higher. Other self-lubricating materials such as tetrafluoroethylene or reinforced tetrafluoroethylene are limited to dynamic loads of approximately 25,000 to 40,000 p.s.i. Furthermore, certain solid film lubricants exhibit better wear coefficients and friction coefficients than other known materials of excellent wear characteristics. The solid film lubricants of this invention are also peculiar because their best wear characteristics and reliability are exhibited in coatings between 0.0003 and 0.00065 inches thick. Since the allowable wear for most engineering design is at least ten times this value, self-lubricating bearings of this invention, utilizing the best wear characteristics of the solid film lubricants to the design wear limit, have exhibited wear lives and load capacities much greater than those of other materials.

Dynamic load capacities of the frusto-conical laminar bearings of this invention are approximately three or four times that of the tetrafluorethylene lined bearings. The depth of wear and wear life may be controlled and varied to suit individual need. Due to the use of multiple wear surfaces, the bearing of this invention exhibits increased reliability since all surfaces must seize to cause catastrophic failure. This invention comprises and contemplates the use of laminations of high strength materials coated on both of the bearing surfaces with solid film lubricants for wear control. The number of laminar parts in an assembly is not limited. However, the life of the assembly and the amount of allowed wear are proportional to the number of coated wear surfaces. The laminations are preferably constrained only to contain them in assembly, it being preferred that the laminae move with rotation of either or both of the inner and outer races to distribute the wear to all coated surfaces. The present invention can be clearly distinguished from a prior art bearing comprising the mating of a ceramic inner race with a compacted carbon outer race to form a sliding bearing. The latter bearing is self-lubricating, but has a dynamic load bearing capacity of less than 1000 p.s.i. and a shorter bearing life than the invention herein disclosed and claimed.

The invention further resides in certain novel features of construction, combinations, and arrangements of parts and further objects and advantages of the invention will be apparent to those skilled in the art to which it pertains from the following description of the present preferred embodiments thereof described with reference to the accompanying drawings, which form a part of this specification, wherein the same reference numerals indicate corresponding parts throughout the several views, and in which:

It is to be understood that the invention is not limited to the details of construction and the arrangements of parts shown in the drawings and herein after described in detail, but is capable of being otherwise embodied and of being practiced and carried out in various ways. It is to be further understood that the terminology employed herein is for the purpose of description and there is no intention to herein limit the invention beyond the requirements of the prior art.

Figure 1:
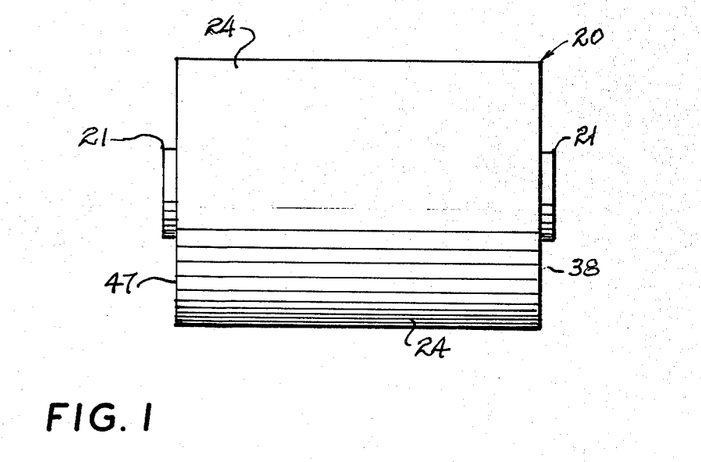
FIG. 1 is a plan view of a journal bearing embodying the invention.
Figure 2:
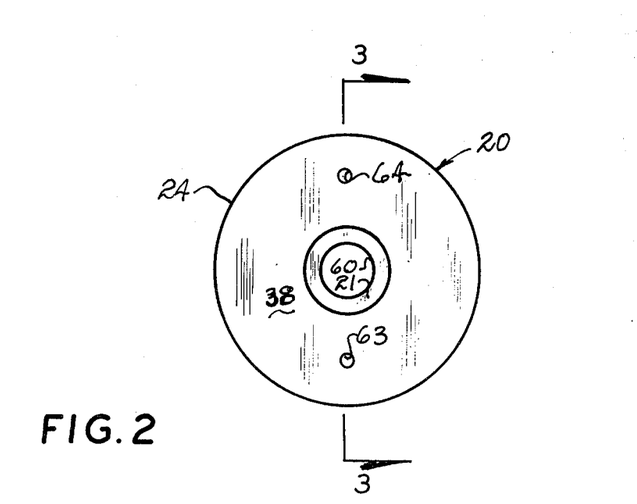
FIG. 2 is an end view of the bearing of FIG. 1.
Figure 3:
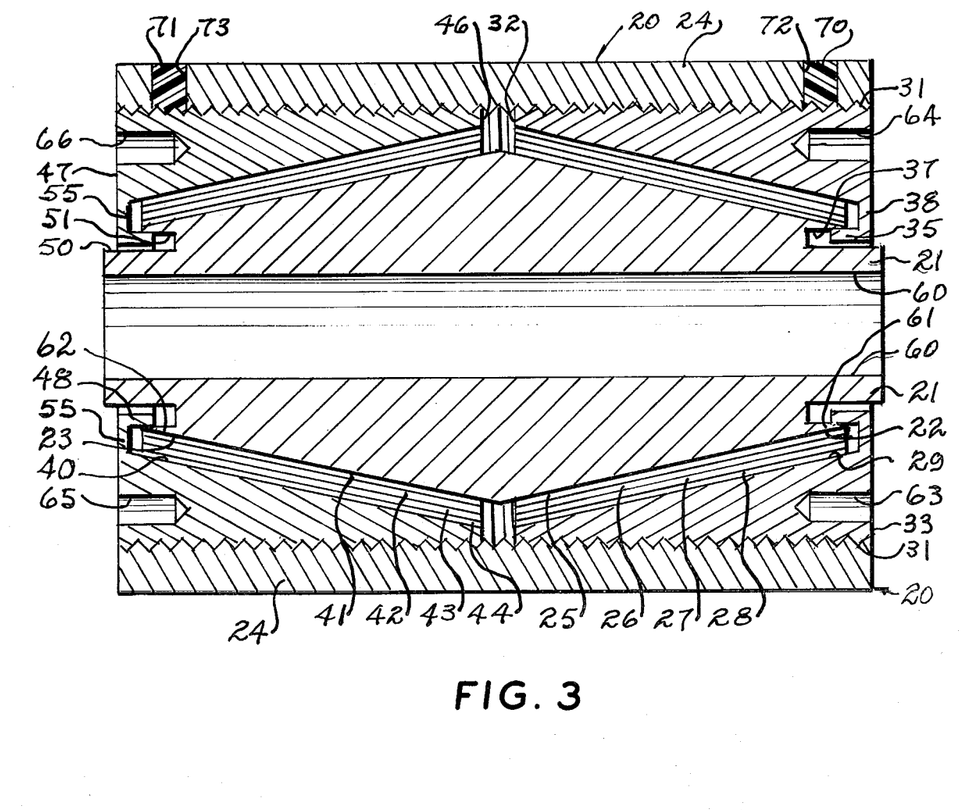
FIG. 3 is an enlarged cross-sectional view taken along section line 3—3 of FIG. 2.

Referring to FIGS. 1, 2, and 3, reference numeral 20 indicates generally a journal bearing embodying the invention. The bearing 20 has a frusto-conical race configuration that provides combined thrust bearing vector means and plain journal bearing vector means. The bearing 20 has an inner sleeve 21 adapted to be fitted onto a central shaft or hub, not shown. The sleeve 21 has two oppositely disposed frusto-conical bearing inner races 22 and 23 having a generally frusto-diamond longitudinal cross-sectional configuration. An internally threaded cylindrical outer bearing housing 24 encircles the bearing sleeve 21 and is coaxial therewith. A plurality of four frusto-conical, concentrically-nested, annular, contiguous bearing laminae or ring portions 25, 26, 27 and 28 are angularly slidably disposed between a first frusto-conical outer bearing race 29 and the first bearing inner race 22. Each of the laminae 25, 26, 27, and 28, and the inner race 22 and the outer race 29 have controlled wear surfaces comprising thin solid film lubricant bonded thereto. The bearing outer race 29 has an external generally cylindrical surface 31 threaded into the housing 24. The bearing outer race 29 has a circular end 32 parallel to a circular outer end 33.

The bearing outer race 29 has an axial dimension of less than one half of the length of the housing 24 as best seen in FIG. 3. An inner periphery of the bearing outer race 29 is of cylindrical tubular configuration to provide an annular, cylindrical flange 35 of a relatively short axial length. The flange 35 is telescopically disposed in a circular annular groove defined by a pair of concentric cylindrical parallel walls 36 and 37 formed in a right hand end of the sleeve 21. The flange 35 encloses the laminae 25, 26, 27, and 28 in the bearing 20 and provides a dust cover of the interior of the bearing 20 at one end thereof.

The bearing outer race 29 is threaded into position to regulate the load on, and/or the sliding fit or tolerances between the laminae 25, 26, 27, and 28 and the bearing races 22 and 29.

A second bearing outer race 40 comprises a frusto-conical inner bearing surface disposed parallel about the bearing inner race 23 of the sleeve 21. The races 23 and 40 have disposed therebetween in sliding relationship with each other four frusto-conical, concentrically-nested, annular, contiguous, bearing laminae or ring portions 41, 42, 43, and 44. The bearing outer race 40 has a threaded external generally cylindrical surface 45 threaded into the housing 24 into a left hand end of the bearing 20 opposite to right hand end thereof occupied by the bearing outer race 29. The bearing outer race 40 has parallel circular inner and outer ends 46 and 47, respectively. The bearing outer race 40 has an axial dimension of less than half of the length of the housing 24, as best seen in FIG. 3.

A radially inner periphery of the bearing outer race 40 is of cylindrical tubular configuration to provide an annular, cylindrical flange 48 of relatively short axial length. The flange 48 is telescopically disposed in an annular groove defined by a pair of concentric cylindrical parallel walls 50 and 51 formed in a left hand end of the sleeve 21 for the purpose of enclosing the laminae 41, 42, 43, and 44 in the bearing 20 and providing a dust cover of the interior of the bearing 20 at one end thereof. The bearing outer race 40 is threaded into position to regulate loading on and/or the sliding fit or tolerances between the laminae 41, 42, 43, and 44 and the bearing races 23 and 40.

The bearing outer races 29 and 40 are of substantially the same configuration. The housing 24 has left hand screw threads throughout the length thereof. Accordingly, the race 29 has left hand screw threads and the race 20 may be said to have left hand screw threads when threaded inwardly in a manner known to one skilled in the art. In some bearing applications it may be desirable to have right hand screw threads, or a combination of left hand and right hand screw threads as the situation may require.

Each of the laminae or ring portions 25, 26, 27, 28, 41, 42, 43, and 44 are of frusto-conical one-piece configuration. More particularly, the ring portion 25 is telescopically disposed in bearing relationship with the ring portion 26. The ring portion 26 is telescopically disposed in bearing relationship with the ring portion 27. The ring portion 27 is telescopically disposed in bearing relationship with the ring portion 28. The bearing sleeve 21 has its inner race 22 telescopically disposed in bearing relationship with the ring portion 25. The bearing portion 28 is telescopically disposed in bearing relationship with the outer race 29.

The bearing outer race 29 of the bearing 20 terminates at one end thereof in a radially inwardly extending bearing portion retainer flange 38 for retaining the bearing portions 25, 26, 27, and 28 in assembly with the sleeve 21. At the other end of the sleeve 21 the bearing outer race 40 terminates in a radially inwardly extending bearing portion retainer flange 55 for retaining the bearing laminae 41, 42, 43, and 44 in assembly with the sleeve 21.

As best seen in FIG. 3, the radial flange 38 interconnecting the tubular portion 35 is axially spaced from the terminal ends of the bearing laminae 25, 26, 27, and 28 so as to remove the possibility of the bearing laminae 25, 26, 27, and 28 binding against or otherwise frictionally engaging the radial flange 38. Similarly, the radial flange 55 interconnecting the tubular portion 48 is axially spaced from the terminal ends of the journal bearing laminae 41, 42, 43, and 44 so as to remove the possibility of the bearing laminae 41, 42, 43, and 44 binding against or otherwise frictionally engaging the radial flange 55. Accordingly, the radial flange 55 extends inwardly radially past the lateral edges of the bearing laminae 41, 42, 43, and 44. It is also noteworthy that the radial flanges 38 and 55 serve to restrict the transgression into the bearing 20 of foreign matter and debris that may operate to shorten the life of the bearing 20 or hinder the proper functioning thereof.

The sleeve 21 has a central cylindrical bore forming a cylindrical wall 60 adapted to be carried on and fixed to a central shaft, not shown. The bearing inner races 22 and 23 of the sleeve 21 are each frusto-conical and terminates in opposed circular end portions 61 and 62, respectively, FIG. 3.

In order to permit the easy adjustment of the bearing outer races 29 and 40 in the housing 24, bearing outer races 29 and 40 are respectively formed with diametrically disposed drilled spanner wrench holes 63, 64, and 65, 66.

Another feature of the invention comprises the provision of two axially spaced nylon brake means 70 and 71 disposed in cylindrical passages 72 and 73 formed in the housing 24 that frictionally engage the threaded surfaces of the bearing outer races 29 and 40, respectively, FIG. 3. Although the nylon brakes 70 and 71 may be threaded into the passages 72 and 73 if desired, it is preferred that the nylon brakes 70 and 71 be press-fitted into the passages 72 and 73, respectively.

The nylon brakes 70 and 71 provide a positive means of opposing any maladjustment of the bearing outer races 29 and 40 relative to the housing 24.

The bearing 20 is self-lubricated and is devoid of any lubricating fluids or liquids, such as lubricating oil or grease, and lubricating grooves and conduits therefor in the bearing 20. As pointed out hereinabove, each bearing race 22, 23, 29, and 40, and each side of each bearing portion 25, 26, 27, 28, 41, 42, 43, and 44, is preferably coated with the thin solid film lubricant of this invention. The thin solid film lubricant is sprayed or painted on the bearing surfaces with the use of an suitable binder material carrying one or more powdered lubricants selected from a group comprising or consisting of preferably molydenum disulfide, fluorinated graphite, and/or graphite. The binder material is preferably a ceramic or a resin material. A preferred resin material is an epoxy resin such as polyepoxide resin. This resin is preferably cured at 400° F. for 1 hour. A preferred ceramic binder material is aluminum phosphate, which may be sintered at temperatures ranging from 700° to 1000° F. for as long as is necessary or desired, depending upon the ceramic binder being used and the sintering temperature. The preferred lubricating powder is the fluorinated graphite which is comprised of powdered graphite that has turned white in appearance due to the fluoridation. The fluorinated graphite measures out to be preferably 1.1 mols fluoride to 6 mols carbon. The solid film lubricant of this invention is applied in thicknesses of from 0.0003 to 0.00065 inches, with the coating on each bearing surface being preferably of from 0.0002 to 0.0005 inches thick. After the coatings are applied by spraying or a painting technique, the bearing portions are cured or sintered, as described hereinabove. The coating and the bearing portions are then ready for use in a bearing assembly together. The bearing coatings may be burnished prior to assembly or in place in the bearing after assembly when the bearing assembly is broken in or put to use.

The bearing surfaces of this invention are preferably of like material bearing against like material. However, it is recognized that in the bearing art it may be customary to mate bearing surfaces of unlike material, such as the mating of hard against soft material in the bearing. Best results are achieved in this invention by using the solid thin lubricant in bearing relationship without resorting to the hard-soft technique.

A preferred thin solid film lubricant of this invention may comprise a mixture of 94% by weight of molydenum disulfide powder with 6% by weight of graphite powder, either plain or fluorinated. Also the laminae 25, 26, 27, 28, 41, 42, 43, and 44 are preferably applied to a thickness of 0.0005, inches for a total lamina of 0.011 inches.

It is understood from the foregoing therefore, that the bearing races 22, 23, 29 and 40 are all painted with the thin solid film lubricant of this invention. Accordingly, the wear surfaces of the bearing 20 total 10 times 0.0005 for a sum of 0.0050 inches wear material. The bearing life may be extended by merely adding more coated laminae, and still carry the same load.

It has also been found in this invention that the journal bearing laminae 25, 26, 27, 28, 41, 42, 43, and 44 may be conical or tapered on the inner and outer bearing surfaces thereof in an amount of 0.010 inch per inch of slope, or with 5° or more slope or taper to prevent binding between the laminae and bearing races of this invention.

Before the thin solid film lubricant is applied, it is to be understood that each surface to be coated is degreased with a suitable cleaner, such as trichloroethylene in a vapor degreaser or cleaner apparatus. The surface so cleaned is then preferably blasted with a grit, such as 200 mesh aluminum oxide grit. The preferred aluminum oxide is $Al_2O_3$.

Figure 4:
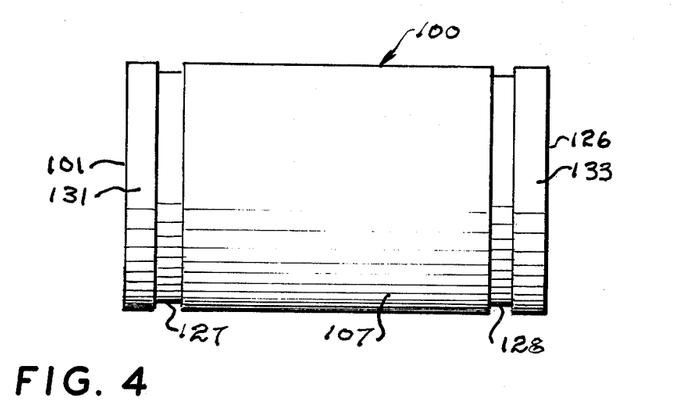
FIG. 4 is a plan view of a modified bearing embodying the invention.
Figure 5:
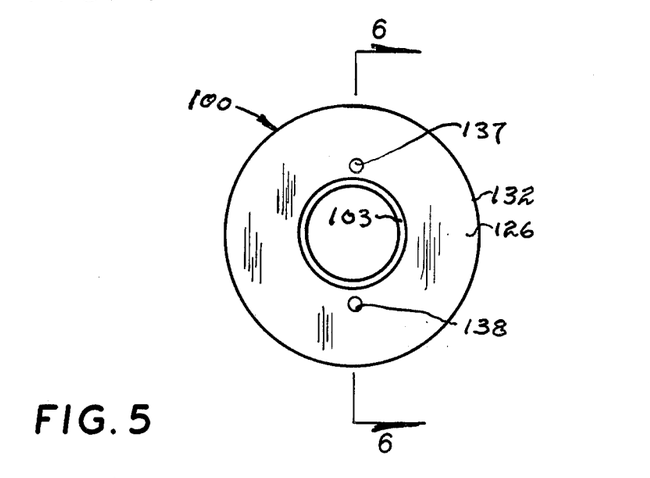
FIG. 5 is an end view of FIG. 4.
Figure 6:
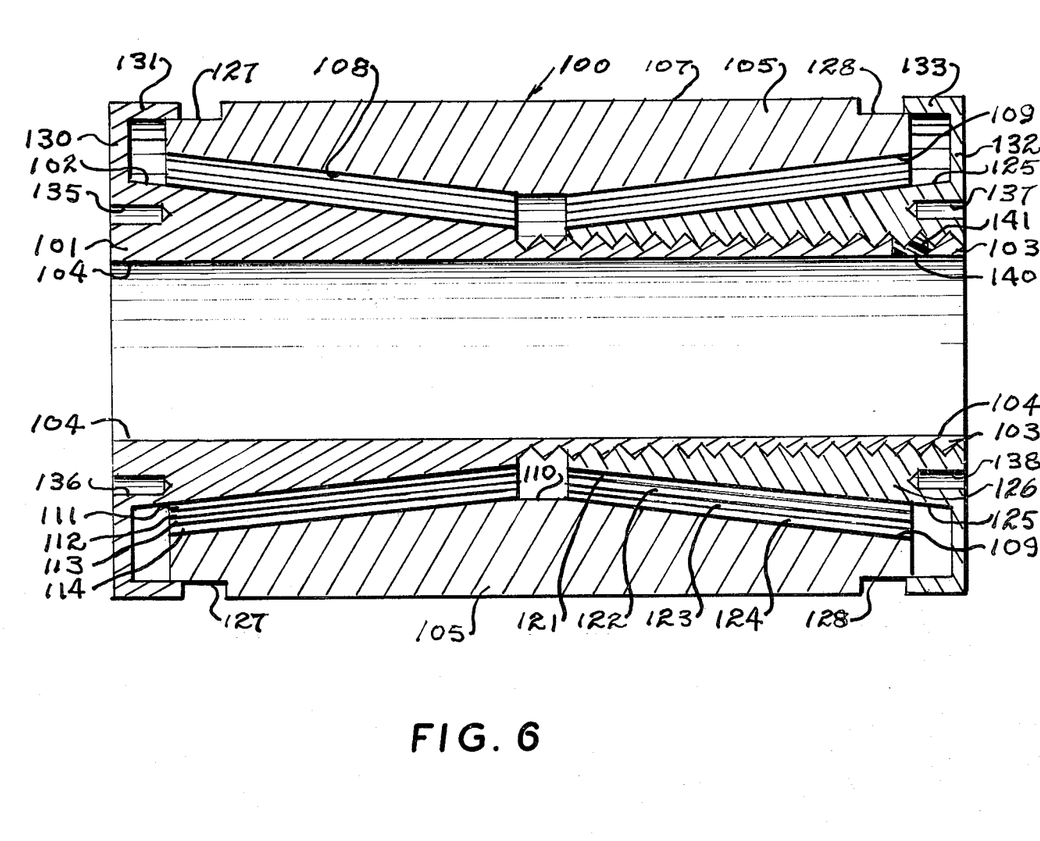
FIG. 6 is an enlarged cross-sectional view taken along section line 6—6 of FIG. 5.

A second embodiment of this invention is a bearing indicated generally by the reference numeral 100, FIGS. 4, 5, and 6. The bearing 100 comprises a sleeve 101 having a frusto-conical bearing inner race 102 formed thereabout adjacent one axial end thereof and an externally threaded generally cylindrical tubular portion 103 formed at the other end thereof. The threaded tubular portion 103 extends over more than half the axial length of the sleeve 101. The sleeve 101 has a central cylindrical axial opening formed by a wall 104 coaxial with the bearing inner race 102. The sleeve 101 is adapted to receive a shaft therein, not shown. An outer housing 105 is coaxially disposed about the sleeve 101, FIG. 6. The housing 105 has a cylindrical outer wall surface 107 and a pair of bearing outer races 108 and 109 formed interiorly thereof. A cylindrical inner wall 110 separates the races 108 and 109. The bearing outer race 108 and the bearing inner race 102 are adapted to have disposed therebetween a plurality of four frusto-conical, concentrically-nested, annular, contiguous bearing laminae or ring portions 111, 112, 113 and 114. The lamina 114 is telescopically disposed in the bearing outer race 108. The lamina 113 is telescopically disposed in the lamina 114. The lamina 112 is telescopically disposed in the lamina 113. The lamina 111 is telescopically disposed in the lamina 112. The bearing inner race 102 is telescopically disposed in the lamina 111, FIG. 3.

The laminae 111, 112, 113, and 114 and the bearing inner race 102 and bearing outer race 108 are coated with the thin solid film lubricant in the manner described in the embodiment of FIGS. 1, 2, and 3. The bearing outer race 109, four bearing laminae or ring portions 121, 122, 123 and 124, and an axially adjustable bearing inner race 125 of a nut-like member 126 threaded onto the portion 103, are similarly coated with the thin solid film lubricant. The laminae 111, 112, 113, 114, 121, 122, 123 and 124 are substantially alike and are tapered at an angle of approximately 6°.

The lamina 124 is telescopically disposed in the bearing outer race 109. The lamina 123 is telescopically disposed in the lamina 124. The lamina 122 is telescopically disposed in the lamina 123. The lamina 121 is telescopically disposed in the lamina 122. The bearing inner race 125 is telescopically disposed in the lamina 121, FIG. 3.

The outer housing 105 has each axial end thereof reduced in diameter for forming cylindrical reduced end portions 127 and 128. The sleeve 101 has the extreme left hand end thereof formed with a radially extending circular flange 130 terminating in a cylindrical flange 131 engaging and enclosing the end portion 127 so as to form a dust cover for the bearing laminae 111, 112, 113, and 114, and the bearing races 102 and 108. The flange 130 is axially spaced from the laminae 111, 112, 113, and 114 and the bearing outer race 108.

The nut-like member 126 carrying the bearing inner race 125 is also formed at the right hand end thereof with a radially extending circular flange 132 terminating in a cylindrical flange engaging the end portion 128 of the housing 105 for forming a dust cover. The flange 132 is axially spaced from the laminae 121, 122, 123, and 124 and the bearing outer race 109, FIG. 3.

In order to easily adjust the loading on and/or tolerances between the laminae 111, 112, 113, 114, 121, 122, 123, and 124 and the bearing races 102, 108, 109, and 125, pairs of diametrically spaced apart spanner wrench drill holes 135, 136, and 137, 138 are respectively formed in the exposed axial ends of the sleeve 101 and the member 126. The spanner wrench drill holes 135 and 136 are equally spaced from the central axis of the sleeve 101. The spanner wrench drill holes 137 and 138 are spaced from the central axis of the member 126.

A cylindrical nylon brake member 140 is press-fitted in a cylindrical opening 141 formed in the tubular portion 103 of the sleeve 101 adjacent the right hand end thereof, FIG. 3. The nylon brake member 140 frictionally engages the threads formed interiorly of the member 126 for preventing or retarding any undesired axial displacement of the member 126 on the tubular portion 103.

The bearing 100 may be termed a journal bearing just as the bearing 20 is termed a journal bearing. However, both of the bearings 20 and 100 have greater journal bearing load capabilities than the thrust bearing capabilities thereof. It is also apparent that the bearings 20 and 100 will not be easily given to axial displacement that may be found in some conventional journal bearings due to the frusto-conical shape of the sliding surfaces of the bearings 20 and 100.

As pointed out hereinabove, the taper of the frusto-conical bearing surfaces of the bearing 100 is approximately 6° and thus provides an included angle of 168° between the two bearing outer races 108 and 109 of the bearing 100. Moreover, the taper of the bearing surfaces in the bearing 20 is approximately 12° and thus provides an included obtuse angle of approximately 156° between the two bearing inner races 22 and 23 of the bearing 20.

Figure 7:
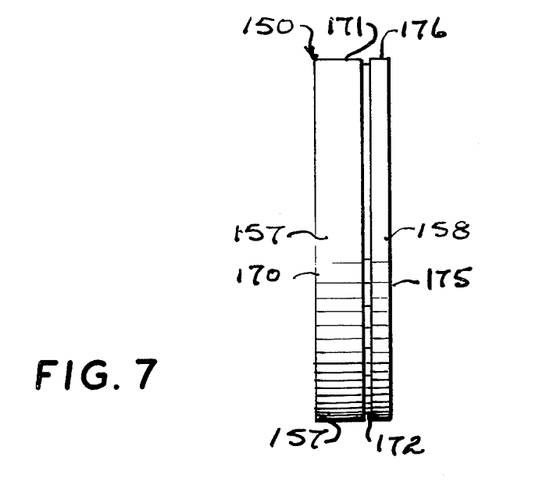
FIG. 7 is a plan view of another modified bearing embodying the invention.
Figure 8:
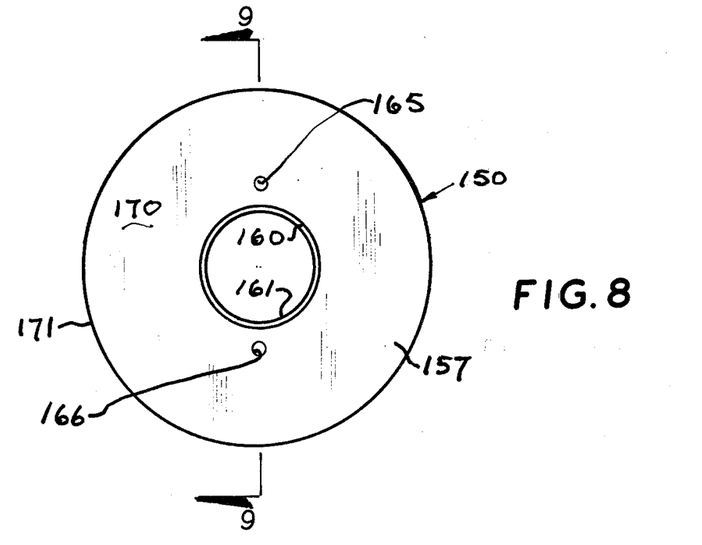
FIG. 8 is an end view of FIG. 7.
Figure 9:
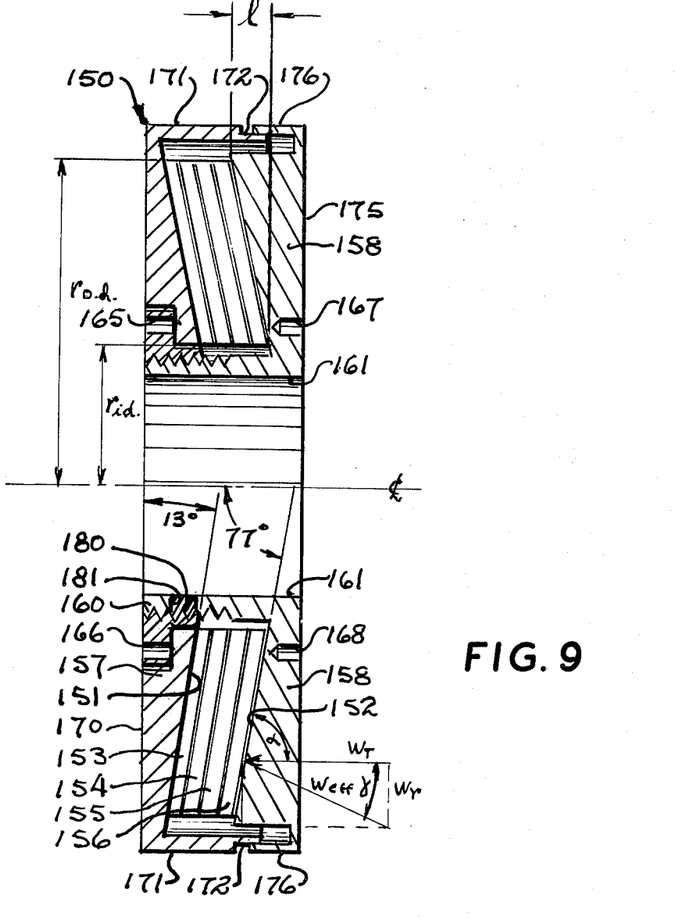
FIG. 9 is an enlarged cross-sectional view taken along section line 9—9 of FIG. 8.

A third modification of this invention is embodied in a thrust bearing indicated generally by the reference numeral 150, FIGS. 7, 8 and 9. The bearing 150 is termed a thrust bearing since it has greater thrust bearing load capabilities than it has journal bearing load capabilities due to the taper of the bearing sliding surfaces thereof. However it will be understood that the bearings 20, 100 and 150 may be termed journal bearings and/or thrust bearings due to their combined journal bearing and thrust bearing capabilities.

The bearing 150 comprises a bearing inner race 151 and a bearing outer race 152 having a plurality of four frusto-conical, concentrically-nested, annular, contiguous, bearing laminae or ring portions 153, 154, 155 and 156 sandwiched therebetween. The bearing inner race 151 is disposed interiorly of a stepped cylindrical nut-like member 157. The bearing inner race 151 is formed interiorly of a member 159 that is free turning relative to the members 157 and 158. The bearing outer race 152 is formed interiorly of a spindle member 158 parallel to the bearing inner surface 151. The nut-like member 157 is threaded onto an axially extending generally cylindrical tubular portion 160 of the spindle member 158 and generally retains the free turning member 159 in place. The member 157 is axially adjustable relative to the spindle member 158. The spindle member 158 has an axially extending bore formed by a cylindrical wall 161 for permitting the spindle member 158 to be mounted on a shaft or spindle, not shown.

The members 157 and 158 may be relatively easily adjusted relative to each other by the use of spanner wrenches, not show, in diametrically opposed spanner wrench drill holes 165, 166, and 167, 168, respectively formed in the members 157 and 158. The spanner wrench holes 165 and 166 are equally spaced from a central axis of the member 157. The spanner wrench holes 167 and 168 are equally spaced from a central axis of the member 158, FIGS. 7, 8, and 9.

The members 159 is formed with a planar circular end face or surface 170 that terminates at the outer periphery thereof in a cylindrical sleeve 171. The sleeve 171 at the axial inner end on the circular periphery thereof terminates in a cylindrical shoulder 172.

The member 158 is formed with a planar circular end face or surface 175 that terminates at the outer periphery thereof in a cylindrical sleeve 176 adapted to telescope over and encircle the shoulder 172 of the member 157 and thus forms a dust cover for substantially enclosed the bearing surfaces of the bearing 150.

The bearing surfaces of the races 151 and 152 and the laminae 153, 154, 155, and 156 are coated with a thin solid film lubricant as described in connection with the bearings 20 and 100. The bearing surfaces of the laminae 153, 154, 155, and 156 and the races 151 and 152 have a taper of approximately 77°.

Accordingly, the bearing 150 may be termed a thrust bearing although the bearing 150 has both journal and thrust bearing capabilities due to the thrust load capabilities of the bearing 150 being greater than the journal bearing capabilities thereof.

Preferably to prevent or resist any undesired axial adjustment of the member 157 on the member 158, a cylindrical nylon brake member 180 is press fitted into a cylindrical opening 181 formed in the tubular portion 160 adjacent the outer, left hand axial end thereof. The nylon brake member 180 frictionally engages the internal threads of the nut-like member 157 and thereby prevents or retard angular displacement of the member 157 on the tubular portion 160 of the member 158.

It will be understood that the taper of the frusto-conical bearing surfaces of this invention may vary from greater than 0°, to less than 90°. However, to prevent binding it is preferred that the taper of the bearing surfaces may be between 5°, and 85°.

In the bearings 20, 100, and 150 described hereinbefore, the optimum life for a given load is obtained with a bearing of maximum length and minimum radius that is of acceptable stiffness to produce substantially uniform load distribution over the entire length of the bearing. Inspection of bearing wear life formulas presented hereinafter show that the radius does not enter into the calculations and that the life in the number of cycles or revolutions is directly proportional to the length of the bearings of this invention. The bearing wear life of this invention can be calculated as shown hereinbelow.

With reference to adhesive wear, the volume V of the wear material removed from a solid surface is directly proportional to the rear area $A_o$ of contact and the distance of travel L or $$V = K\, A_o\, L \qquad \text{(Equation 1)}$$

where $K$ is described as an adhesive wear coefficient. Since the real area of contact is equal to the ratio of load to hardness in terms of compressive yield and can be written as $W/H$. Then by substitution, $$V = K\, W\, L/H \qquad \text{(Equation 2)}$$

By including hardness $H$ in the constant, $$V = K'\, W\, L \qquad \text{(Equation 3)}$$

where $K'$ is the wear coefficient for any given material.

The equation 3 hereinabove is the general form equation for adhesive wear, either for unlubricated wear or for thin solid film lubricants. The calculation of bearing life for comparison between the laminar bearings and conventional plain bearings may be accomplished through variations of the equation 3. Accordingly, the following equations may be derived from three basic types of bearings.

Wear on the rotating member of a journal bearing, such as shown in FIGS. 1 through 9, may be expressed as:

$$h = K'\, W\, N/l \qquad \text{(Equation 4)}$$

Wear on the stationary member of either the journal bearing may be expressed as:

$$h_m = Pi\, k'\, W\, N/l \qquad \text{(Equation 5)}$$

Wear on either surface of a thrust bearing, such as shown in FIGS. 1 through 9, is expressed as follows:

$$h = \frac{k'\, W\, (r_{(o.d.)} + r_{(i.d.)})\, N}{r^2_{(o.d.)} - r^2_{(i.d.)}} \qquad \text{(Equation 6)}$$

or, $$h = K'\, S\, L$$

Wear on either surface of linear motion bearings is expressed as:

$$h_m = k'\, S\, L = k'\, \frac{W}{A}\, L \qquad \text{(Equation 7)}$$

where:
$h$ = the average depth of wear in inches.
$h_m$ = the maximum radial depth of wear in inches.
$W$ = the bearing load in pounds.
$k'$ = the wear coefficient for the bearing material in square inches/lb.
$l$ = the length of bearing in inches.
$N$ = the number of revolutions.
$r_{(o.d.)}$ = outer radius of bearing in inches.
$r_{(i.d.)}$ = inner radius of bearing in inches.
$S$ = the maximum design stress.
$A$ = the apparent minumum area of contact.
$L$ = the sliding distance of any point on the bearing surface that travels the maximum distance.

Figure 10:
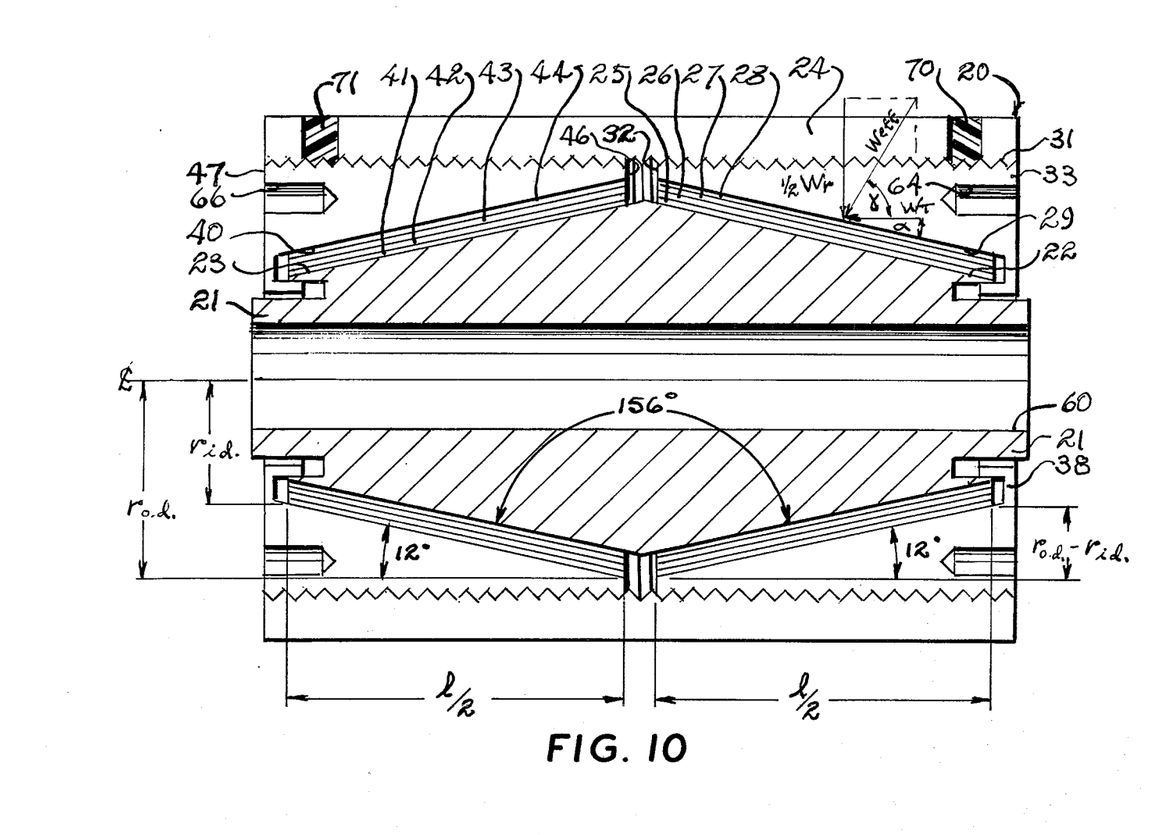
FIG. 10 is an enlarged cross-sectional view similar to FIG. 3 of the embodiment of FIGS. 1, 2, and 3 and shows mathematical indicia of calculations set forth in the specification.

FIGS. 9 and 10 each shows the length 1 of the bearings 20 and 150 and the outer radius, $r_{(o.d.)}$, and the inner radius, $r_{(i.d.)}$, of the bearings 20 and 150.

The following examples are presented to show the relative predictable life between a laminar bearing of this invention and a plain journal having lined with reinforced tetrafluoroethylene self-lubricating material under the following identical conditions: $h_m = 0.005$ inch $W = 10,000$ lbs.; $k' = 1.5 \times 10^{-11}$ in$^2$/lbs. for reinforced tetrafluoroethylene; $k' = 0.95 \times 10^{-12}$ in$^2$/lbs. for a good solid film lubricant of this invention; $l = 1.000$ inch; and the outer bearing race is held stationary while the shaft and inner bearing race are rotating. Both of the values for $k'$ have been empirically obtained. The lining of the reinforced tetrafluoroethylene bearing is bonded in most instances to the inner surface of the journal bearing, which is the stationary member in this example. Since all of the wear occurs on the inner race, wear life is calculated from the equation 5, as follows:

$$0.005 = \frac{Pi \times 1.5 \times 10^{-11} \times 10,000 \times N}{1,000}$$

$N = 10,600$ revolutions.

If the bearing is designed so that the lined member rotates, then equation 4 applies and a diametral wear of 0.005 inch occurs when 0.0025 inch is worn radially from the surface. This may be expressed as:

$$0.0025 = \frac{1.5 \times 10^{-11} \times 10,000 \times N}{1,000}$$

$N = 16,650$ revolutions.

In the laminar bearing of this invention, all of the elements except the outer housing are free to rotate and will do so at some time during the life of the bearing. By limiting and radial depth of wear on each surface to 0.00026 inches for the calculation of this example, the total diametrical wear would be 0.00494 inches. The wear on one stationary part would be:

$$0.00026 = \frac{Pi \times 0.95 \times 10^{-12} \times 10,000 \times N}{1,000}$$

$N = 8,700$ revolutions

The wear on nine sliding parts would be:

$$9 \times 0.00026 = \frac{0.95 \times 10^{-12} \times 10,000 \times N}{1,000}$$

$N = 246,000$ revolutions.

The total wear life for 0.0049 inch wear is:
$N = 8,700 + 246,000$
$N = 254,700$ revolutions.

A calculation of the thrust bearing life $N$ in cycles of the embodiment of FIGS. 7, 8, and 9 is relatively simple due to the fact that the inner radius, $r_{(i.d.)}$, and the outer radius, $r_{(o.d.)}$, of each of the laminae 153, 154, 155 and 156 is the same value. However, in the bearing 20, this is not the case, so thrust bearing wear life and load capabilities may be calculated separately for each of the laminae 25, 26, 27, 28, 41, 42, 43, and 44 and then totaled. For purposes of illustration, the inner and outer radii of the outermost laminae 28 and 44 are shown in FIGS. 10.

The foregoing calculations show that in a laminar bearing of this invention, the wear life on the stationary member and the rotating member and laminae totals 254,700 revolutions. In contra-distinction thereto, the wear life on the stationary member of a reinforced tetrafluorethylene journal bearing is 10,600 revolutions, and on its rotating member the wear life is 16,650 revolutions. Since the radius of spherical bearing do not enter into the calculations, as can be seen by an inspection of the formulae, the wear life would be the same on the bearing of this invention and the same on the reinforced tetrafluorethylene bearing as for the journal bearings.

For thrust bearings where $S = 10,000$ p.s.i., the wear life of a bearing of this invention would be 525,000 inches average circumferential sliding distance for 0.0005 inch wear. A reinforced tetrafluorethylene thrust bearing's wear life would be 33,300 inches average circumferential sliding distance for 0.0005 inch total wear. The same wear life in inches would occur in linear motion bearing as for thrust bearings as between a bearing of this invention and the reinforced tetrafluorethylene bearing.

When there are combined thrust and radial loads on any on the bearings having frusto-conical laminae, the life limiting wear will occur on the side of the bearing where the thrust load causes compression loading of the laminar elements. The following formulae are presented for the calculation of wear life and combined loads.

For a journal bearing design, such as in FIGS. 1, 2, 3, 4, 5, 6, and 10;

$Weff = \frac{1}{2}Wr/\sin = Wt/\cos$

Where:
$Wr$ = the total radial load
$Wt$ = the total thrust load
$Weff$ = the resultant load reacting on the frusto-conical laminae under analysis
$\alpha$ = the angle between the conical surfaces and the axis of rotation of the bearing. ($\alpha$ is less than 90°).
$\gamma$ = the angle that $Weff$ makes with the axis of rotation,
$\gamma$ = arc tan ½ $Wr/Wt$ Where ($\alpha+\gamma$) is greater than 90°, calculate wear life of the elements reacting to the thrust loads using ½ $Wr$ as the load and the conical height of the elements as the length $l$.

Where ($\alpha+\gamma$) is less than 90°:
a. If $[\cos(\alpha+\gamma) \times Weff]$ is less than dynamic $[\mu f \times \sin(\alpha+\gamma) \times Weff]$
b. If $[\cos(\alpha+\gamma) \times Weff]$ is greater than $[\mu f \times \sin(\alpha+\gamma) \times Weff]$ calculate life as a thrust bearing using $Weff$ as the load.
c. If $[\cos(\alpha+\gamma) \times Weff]$ is approximately equal to $[\mu f \times \sin(\alpha+\gamma) \times Weff]$, life should be calculated both ways and, for assurance of satisfactory life, the lower value should be used.

For a thrust bearing design, FIGS. 7, 8, and 9, but assuming only one set of frusto-conical laminae:

$\gamma$ = arc tan ½ $Wr/Wt$ $Weff = Wr/\sin = Wt/\cos$

Where ($\alpha+\gamma$) is less than 90° calculate life as a thrust bearing using Weff as the load. However, if two sets of opposing laminae are present as in the journal bearing configuration of FIGS. 1 through 6 and FIG. 10, ½ $Wr$ should be substituted for $Wr$.

Where ($\alpha+\gamma$) is greater than 90°,
a. If $\cos[180 - (\alpha+\gamma)] \times Weff$ is greater than the dynamic $\mu f \times \sin[180 - (\alpha+\gamma)] \times Weff$, calculate life as a journal bearing, using Weff as the load and the conical height of the elements under the combined load as 1.
b. If $\cos[180 - (\alpha+\gamma)] \times Weff$ is less than the dynamic $\mu f \times \sin[180 - (\alpha+\gamma)] \times Weff$ calculate as a thrust bearing using Weff as the load.
c. If $\cos[180 - (\alpha+\gamma)] \times Weff$ is approximately equal to $\mu f \times \sin[180 - (\alpha+\gamma)] \times Weff$, life should be calculated both ways and, for assurance of satisfactory life, the lower value should be used.

It has been found that if the coating is made too thick, that it will spall out or flake off. This is why the coating is preferably made 0.0003 to 0.0005 inch thick. It has also been found that when spraying on the solid film lubricant, that three passes will cause the coating to measure approximately 0.0002 inch thick, depending of course on the micron size of the graphite and the binder being used. Ordinarily, as a rule of thumb, the coating comprises four parts lubricant powder to one part resin binder, by weight. Accordingly, where it is desired to have the coating measure 0.0003 to 0.0005 inch, it can be estimated that no more than six passes will be needed at most, and that five passes would be the safest number. It will be understood that in production quantities, more accurate methodology will be applied.

Although the bearings contemplated by this invention apparently may not outlast the conventional roller and ball bearings at lower loads, the bearings of this invention will greatly outperform the prior art bearings referred to herein at the upper loads. Accordingly, the laminar bearings of this invention having the solid film lubricant will carry loads of one hundred thousand pounds for up to one million cycles or more. Moreover, with reference to the two types of self-lubricanted bearings referred to hereinabove the bearings of this invention will far outperform these bearings insofar as maximum load capacity is concerned.

It will be understood that this invention can be modified to adapt it to various circumstances and conditions, and it is accordingly desired to comprehend within the purview of this invention such modifications as may be considered to fall within the scope of the appended claims.

What is claimed is:

1. In combination, a Frusto-Conical bearing comprising of frusto-conical inner bearing race means, frusto-conical outer bearing race means having external coaxial threads formed thereon, multiple thin internesting frusto-conical laminae bearing means comprising of a plurality of thin internesting laminae coaxially disposed in sliding bearing relationship between said frusto-conical inner race means and frusto-conical outer race means, said internesting laminae bearing means having individual laminae base material thickness less than 0.012 inches, an outer body means for containing said elements having internal threads to threadedly engage the threaded exterior threads of said outer bearing race means, said inner bearing race means, said outer bearing race means, and said concentric internesting bearing laminae means having bearing surfaces tapered at an angle between five degrees and eighty-five degrees, said inner bearing race means, said outer bearing race means, said concentric internesting laminae bearing means, and said outer body means being being constructed of identical metallic material having a compressive strength greater than 120,000 pounds per square inch, tapered sliding bearing surfaces of the inner bearing race means, the outer bearing race means, and the concentric internesting laminae bearing means being provided with a thin bonded interfacial friction-control coating means possessing a stable kinetic coefficient of friction less than 0.09 under dynamic loads greater than 60,000 pounds per square inch and less than one half the kinetic coefficient of friction of the uncoated elements under identical dynamic loads thereby providing frictional control of and relocation of said tapered sliding bearing interfaces in sliding wear upon depletion of said friction-control coating, said bonded friction-control coating means being an admixture of a thermally stable organic or inorganic adhesive matrix and powdered lubricating solids and having a coating thickness between 0.00065 and 0.00025 inches, said friction-control coating admixture possessing dynamic wear rates less than one percent of the wear rate of the uncoated elements under dynamic loads greater than 60,000 pounds per square inch.

2. Bearing in accordance with claim 1 wherein the load bearing structural elements are constructed of ceramic material having a compressive strength greater than 120,000 pounds per square inch.

* * * * *